US011576836B2

(12) United States Patent
Lee (10) Patent No.: US 11,576,836 B2
(45) Date of Patent: Feb. 14, 2023

(54) MASSAGE CHAIR AND METHOD FOR OPERATING THE MASSAGE CHAIR

(71) Applicant: LG ELECTRONICS INC., Seoul (KR)

(72) Inventor: Joong Keun Lee, Ansan-si (KR)

(73) Assignee: LG ELECTRONICS INC., Seoul (KR)

( * ) Notice: Subject to any disclaimer, the term of this patent is extended or adjusted under 35 U.S.C. 154(b) by 757 days.

(21) Appl. No.: 16/562,049

(22) Filed: Sep. 5, 2019

(65) Prior Publication Data

US 2019/0388296 A1  Dec. 26, 2019

(30) Foreign Application Priority Data

Jul. 3, 2019  (KR) .......................... 10-2019-0079928

(51) Int. Cl.
*A61H 15/00* (2006.01)
*H04W 4/02* (2018.01)

(52) U.S. Cl.
CPC ........ *A61H 15/0078* (2013.01); *H04W 4/025* (2013.01); *A61H 2201/0149* (2013.01); *A61H 2201/501* (2013.01); *A61H 2201/5007* (2013.01); *A61H 2201/5064* (2013.01); *A61H 2201/5097* (2013.01); *A61H 2203/0431* (2013.01); *A61H 2230/00* (2013.01)

(58) Field of Classification Search
CPC .......... A61H 39/00; A61H 1/00; A61H 7/004; A61H 2201/5064; G16H 40/60
See application file for complete search history.

(56) References Cited

U.S. PATENT DOCUMENTS

| 2015/0230056 A1* | 8/2015 | Shin ..................... H04L 12/2818 455/420 |
| 2017/0019837 A1* | 1/2017 | Katar ................ H04W 36/0094 |
| 2018/0084915 A1* | 3/2018 | Norman .................... A47C 5/04 |
| 2020/0072635 A1* | 3/2020 | Hornstein .............. B60N 2/976 |
| 2021/0022955 A1* | 1/2021 | Wersland ............. A61B 5/4806 |

FOREIGN PATENT DOCUMENTS

| KR | 10-2014-0103527 A | 8/2014 |
| KR | 10-2014-0137212 A | 12/2014 |

* cited by examiner

*Primary Examiner* — Samchuan C Yao
*Assistant Examiner* — Nathan M Le
(74) *Attorney, Agent, or Firm* — Birch, Stewart, Kolasch & Birch, LLP (57) ABSTRACT

A massage chair and a method of operating a massage chair, in which operations are controlled by executing artificial intelligence (AI) algorithms and/or machine learning algorithms in a 5G environment connected for Internet-of-Things. The method of operating a massage chair includes obtaining, from a user terminal, first information corresponding to geographic information generated by the user terminal, obtaining, from the user terminal, second information corresponding to motion information generated by the user terminal, obtaining, from the user terminal, third information corresponding to usage information of the user terminal, generating fourth information as additional information using one or more among the first information, the second information, and the third information, and determining an optimal driving mode with respect to a user of user terminal by using the first information to the fourth information.

18 Claims, 6 Drawing Sheets

MASSAGE CHAIR AND METHOD FOR OPERATING THE MASSAGE CHAIR

CROSS-REFERENCE TO RELATED APPLICATION

This present application claims benefit of priority to Korean Patent Application No. 10-2019-0079928, entitled "MASSAGE CHAIR AND METHOD FOR OPERATING THE MASSAGE CHAIR," filed on Jul. 3, 2019, in the Korean Intellectual Property Office, the entire disclosure of which is incorporated herein by reference.

BACKGROUND

1. Technical Field

The present disclosure relates to a massage chair and a method for operating a massage chair, and more specifically, to a massage chair and a method of operating a massage chair, which determine in advance, while the user is absent from home, an optimal operation mode for a user-customized massage chair by using information obtained from a user terminal provided to the user, so that when the user returns home, the user can receive a massage in the determined optimal operation mode.

2. Description of Related Art

In recent years, numerous devices have been developed to be utilized at home or at places such as gyms for maintaining or enhancing one's health and physical strength, or alleviating fatigue and stress, and have been widely used in daily life. Such devices include exercise equipment such as a treadmill, or massage devices.

In particular, there has been an increasing interest in massage devices due to increasing demand for relieving stiff muscles or alleviating fatigue and stress through massage. Massage is one medical assist technique applied with hands or special tools, which promotes blood circulation and relieving stress by stroking, kneading, pressing, pulling, tapping, or moving the body. A device performing such a massage using a mechanical device is called a massage device, and one representative example of such a massage device may be a massage chair which allows a user to stay comfortably seated while receiving a massage.

In Korean Patent Application Publication No. 10-2014-0137212 (hereinafter referred to as "Related Art 1"), disclosed is a massage chair capable of massaging all parts of the body in need of massage by adjusting the length of a portion supporting a user's legs according to the length of the user's legs, through adjusting the length of a part corresponding to the region above and below the user's knees, which are joint regions that do not need massage.

In Korean Patent Application Publication No. 10-2014-0103527 (hereinafter referred to as Related Art 2), disclosed is a massage chair which enables the main body thereof, on which the user's body is supported, to be slidably installed on a support member fixed on an installation site, thereby reducing the installation space thereof.

However, in Related Art 1 and Related Art 2, in order for a user to use a massage chair to receive massage services, the user is required to manually operate the driving mode of the massage chair. Thus, those users having difficulties operating the massage chair are prevented from fully and conveniently utilizing the massage chair.

The background art described above may be technical information retained by the present inventors in order to derive the present disclosure or acquired by the present inventors during the process of deriving the present disclosure, and thus is not necessarily a known art disclosed to the general public before the filing of the present application.

RELATED ART DOCUMENTS

Patent Documents

Related Art 1: Korean Patent Application Publication No. 10-2014-0137212 (Dec. 2, 2014)
Related Art 2: Korean Patent Application Publication No. 10-2014-0103527 (Aug. 27, 2014)

SUMMARY OF THE INVENTION

An aspect of the present disclosure is to determine the operation mode of a user-customized massage chair by using information obtained from a user terminal provided to a user.

Another aspect of the present disclosure is to permit users having difficulties operating massage chairs to receive massage services through a massage chair of which the operation mode is automatically determined.

Another aspect of the present disclosure is to predict a physical condition of the user before the user returns from an absence by using information obtained from a user terminal provided to the user, and determine the operation mode of a user-customized massage chair in accordance with the predicted physical condition.

Another aspect of the present disclosure is to predict a physical condition of a user by using information obtained from a user terminal provided to the user who remains present in an indoor space, and determine the operation mode of a user-customized massage chair in accordance with the predicted physical condition.

Another aspect of the present disclosure is to recognize a prolonged absence of a user by using information obtained from a user terminal provided to the user, and cut off power to a massage chair.

A method of operating a massage chair according to an embodiment of the present disclosure may include determining an optimal operation mode for a user-customized massage chair before the user, who had left home, returns, by using information obtained from a user terminal provided to the user.

More specifically, a method of operating a massage chair according to an embodiment of the present disclosure includes obtaining, from a user terminal, first information corresponding to geographic information generated by the user terminal, obtaining, from the user terminal, second information corresponding to motion information generated by the user terminal, obtaining, from the user terminal, third information corresponding to usage information of the user terminal, generating fourth information as additional information using one or more among the first information, the second information, and the third information, and determining an optimal driving mode for a user provided with the user terminal by using the first information to the fourth information.

Through a method of operating a massage chair according to the present embodiment, users not familiar with operating the massage chair may conveniently utilize the massage chair, and after using the massage chair, the users may experience benefits in terms of fatigue recovery and stress release.

In addition, the obtaining of the first information may include obtaining the first information as global positioning system (GPS) information including location information and time information corresponding to the location information, the location information including a longitude and latitude of the user terminal.

In addition, the obtaining of the second information may include obtaining the second information as motion state information which classifies the motion of the user terminal into a motionless state or an in-motion state by using information sensed by a sensor provided in the user terminal.

In addition, the obtaining of the third information may include obtaining the third information as usage time information of the user terminal and information quantifying usage time and usage frequency of an application provided in the user terminal.

In addition, the obtaining of the second information may include obtaining motion detection information of the user terminal sensed by a sensor provided in the user terminal, and the obtaining of the fourth information includes generating motion state information of the user terminal by applying the motion detection information to a motion state change algorithm and a coarse motion classifier (CMC) provided within the massage chair.

In addition, the generating of the fourth information may include generating the fourth information as first additional information by using the first information, the first additional information including relevant area information and surrounding environment information with respect to a place where the user terminal is located.

In addition, the generating of the fourth information may include generating the fourth information as second additional information by using the first and second information, the second additional information including map information corresponding to a travel route of the user terminal moving from one point to another point.

In addition, the generating of the fourth information may include generating the fourth information as third additional information by using one or more among the first information, the second information, and the third information, the third additional information including type information of a mode of transport being utilized by the user provided with the user terminal, on the travel route of the user terminal moving from the one point to the other point.

In addition, the obtaining of the fourth information may include generating the fourth information as fourth additional information by using one or more among the first information, the second information, and the third information, the fourth additional information including estimated arrival time information on the time at which the user provided with the user terminal is to arrive at a point where the massage chair is disposed.

In addition, the generating of the fourth information may include generating the fourth information as fifth additional information by using one or more among the first information, the second information, and the third information, the fifth additional information including physical condition prediction information predicting the physical condition of the user.

Through the generating of the fourth information according to the present embodiment, the operation mode of a user-customized massage chair may be determined differently depending on specific circumstances of the user, and therefore, notwithstanding that the massage chair is a mass-produced uniform product, the user may perceive the massage chair as a personalized device, thus creating the effect of a user-customized product.

Also, the determining of the optimal operation mode of the massage chair may include determining an optimal operation mode with respect to the user provided with the user terminal from the first information to the fourth information by using a deep neural network previously trained to determine the operation mode of the massage chair.

A massage chair according to another embodiment of the present disclosure may include a first acquisition unit obtaining, from a user terminal, first information corresponding to geographic information generated by the user terminal, a second acquisition unit obtaining, from the user terminal, second information corresponding to motion information generated by the user terminal, a third acquisition unit obtaining, from the user terminal, third information corresponding to usage information of the user terminal, a generation unit generating fourth information as additional information using one or more among the first information, the second information, and the third information, and a determining unit determining an optimal driving mode with respect to a user provided with the user terminal using the first information to the fourth information.

Through a massage chair according to the present embodiment, users having difficulties operating the massage chair may conveniently utilize the massage chair, and the users may experience benefits such as fatigue reduction and stress relief after using the massage chair.

Also, the first acquisition unit may obtain the first information as GPS information including location information and time information corresponding to the location information, the location information including a longitude and latitude of the user terminal.

Also, the second acquisition unit may obtain the second information as motion state information which classifies a motion of the user terminal into a motionless state or an in-motion state by using information sensed by a sensor provided in the user terminal.

Also, the third acquisition unit may obtain the third information as usage time information of the user terminal and information quantifying usage time and usage frequency of an application provided in the user terminal.

Also, the second acquisition unit may obtain motion detection information of the user terminal sensed by a sensor provided in the user terminal, and the generation unit may generate motion state information of the user terminal by applying motion detection information to a motion state change algorithm and a CMC provided inside the massage chair.

Also, the generation unit may generate the fourth information by using one or more among the first information, the second information, and the third information, the fourth information including type information of a mode of transport being used by the user provided with the user terminal on a travel route of the user terminal moving from one point to another point.

Also, the generation unit may generate the fourth information by using the first information and the second information, the fourth information including estimated arrival time information on an estimated arrival time at which the user provided with the user terminal is to arrive at a point where the massage chair is disposed.

Through the generation unit according to the present embodiment, the operation mode of a user-customized massage chair may be determined differently depending on specific circumstances of the user, and therefore, notwithstanding that the massage chair is a mass-produced uniform product, the user may perceive the massage chair as a personalized device, thus creating the effect of a user-customized product.

Also, the determining unit may determine an optimal operation mode with respect to the user provided with the user terminal from the first information to the fourth information by using a deep neural net previously trained to determine an operation mode of the massage chair.

In addition to the aforementioned, other processes and other systems for implementing the present disclosure, and computer programs for implementing such processes, may be further provided.

Aspects, features, and advantages of the present disclosure other than the aforementioned will be more apparent with reference to the accompanying drawings, the appended claims, and the detailed description of embodiments.

According to the present disclosure, a user-customized operation mode of a massage chair may be determined using information obtained from a user terminal provided with a user, thus allowing the user to conveniently utilize the massage chair.

Also, since the operation mode is automatically determined, the user having difficulties operating the massage chair may conveniently utilize the massage chair.

Also, during a prolonged absence from an indoor space of a user and before the user returns, a physical condition of the user may be predicted using information obtained from the user terminal provided to the user, and an operation mode of the user-customized massage chair may be determined in response to the predicted physical condition, so that the user using the massage chair can experience benefits in terms of fatigue recovery and stress relief.

Also, by using information obtained from the user terminal provided to a user who is not absent but located in an indoor space, a physical condition of the user may be predicted and an operation mode of the user-customized massage chair may be determined in response to the predicted physical condition, so that the user using the massage chair can experience benefits in terms of fatigue recovery and stress relief.

Also, using information obtained from the user terminal provided to the user, a prolonged absence of the user may be recognized and the power to the massage chair may be cut off, thus providing energy-saving effects.

Also, notwithstanding that the massage chair is a mass-produced uniform product, the user may perceive the massage chair as a personalized device, thus creating the effect of a user-customized product.

Advantages of the present disclosure are not limited to the foregoing features, and any other advantages not mentioned will become more apparent from the following detailed description to those skilled in the art to which the present disclosure pertains.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Advantages and features of the present disclosure and methods of achieving the advantages and features will be more apparent with reference to the following detailed description of embodiments in connection with the accompanying drawings. However, the description of particular embodiments is not intended to limit the present disclosure to the particular embodiments disclosed herein, but on the contrary, it should be understood that the present disclosure is to cover all modifications, equivalents and alternatives falling within the spirit and scope of the present disclosure. The embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification if so deemed that such details are not necessary to obtain a complete understanding of the present disclosure.

The terminology used herein is used for the purpose of describing particular embodiments and is not intended to limit the scope of the present disclosure. The singular forms include the plural references unless the context clearly dictates otherwise. Throughout the present specification, the terms "comprises," "comprising," "includes," "including," "containing," "has," "having" or any other variation thereof specify the presence of stated features, integers, steps, operations, elements, and/or components, but do not preclude the presence or addition of one or more other features, integers, steps, operations, elements, and/or components. The terms such as "first," "second," and other numerical terms may be used herein only to describe various elements, but these elements should not be limited by these terms. These terms such as "first," "second," and other numerical terms, are used only to distinguish one element from another element.

Throughout the present specification. "first information" may be global positioning system (GPS) information representing geographic information of a user terminal (200 in FIG. 1), obtained from the user terminal 200 located in an indoor and/or outdoor space. The user terminal 200 may be provided with a GPS module (or a receiver, not illustrated) therein in order to generate the GPS information. The GPS module may receive radio signals from a plurality of orbiting GPS satellites (not illustrated), and by using the time of arrival of a radio signal from a GPS satellite at the user terminal 200, may calculate location information (longitude and latitude coordinates) of the user terminal 200, and calculate time information of when the location information is calculated. Here, the longitude and latitude coordinates refer to the combination of a longitude value and a latitude value of a point on the globe when the globe is horizontally divided from 360° into 180° eastern longitudes and 180° western longitudes, and vertically divided from 180° into 90° northern latitudes and 90° southern latitudes.

Throughout the present specification, "second information" may be motion state information of the user terminal obtained from the user terminal 200 located in an indoor and/or outdoor space. Here, the motion state information of the user terminal 200 may include a motionless state and an in-motion state. The user terminal 200 may use a sensor (not illustrated), a motion state change algorithm (not illustrated), and a coarse motion classifier (CMC, not illustrated) to generate the motion state information. The sensor may be provided inside or outside the user terminal 200 to detect motion, and may include, for example, an acceleration sensor. The motion state change algorithm may be provided inside the user terminal 200 so as to determine the motion state of the user terminal 200, and may include an algorithm that monitors continuous motion states and detects an arbitrary conversion between a motionless state and an in-motion state, such as an instant change detection (ICD) algorithm, a cumulative sum control chart (CUSUM)-based change detection (CCD) algorithm, and a CUSUM-based and collapse change detection (CCCD) algorithm. The CMC may classify the motion state of the user terminal 200 into the following eight states by using the information sensed by the sensor and the result of executing the motion state change algorithm: sit, stand, absolute rest, fiddle, walk, run, and in-transit. Here, the motion states of sit, stand, absolute rest, and fiddle may correspond to motion state information indicating a motionless state of the user terminal 200. In addition, the motion states of walk, run, and in-transit may correspond to motion state information indicating an in-motion state of the user terminal 200. Here, the in-transit state may mean that the user provided with the user terminal 200 is en route by means of an arbitrary mode of transport, such as a car, a train, or an airplane. In some embodiments, the massage chair 100 may generate the second information. To this end, the massage chair 100 may obtain motion detection information sensed by a sensor of the user terminal 200 from the user terminal 200. The massage chair 100 may generate the second information as motion state information of the user terminal 200 by using the motion detection information obtained from the user terminal 200, the motion state change algorithm provided inside the massage chair 100, and the CMC.

Throughout the present specification, "third information" may be usage amount information of the user terminal 200, obtained from the user terminal 200 located in an indoor and/or outdoor space. Here, the usage amount of the user terminal 200 may include usage time information of the user terminal 200 and information quantifying usage time and usage frequency of an application (for example, a video watching application, a game, and a social network service (SNS)) installed on the user terminal 200.

Throughout the present specification, "fourth information" may be additional information that the massage chair (100 in FIG. 1) obtains through the network (400 in FIG. 1) from an external device (not illustrated) or directly generates by using the first information, the second information, and the third information previously described, obtained from the user terminal 200. Here, the additional information may be a parameter which determines the driving mode of the massage chair 100 with the previously described first to third information. Such additional information may include first, second, third, fourth, and fifth additional information. The first additional information may include relevant area information and surrounding environment information with respect to a place where the user terminal 200 is located. The second additional information may include map information corresponding to a travel route of the user terminal 200 moving from one position to another position. The third additional information may include type information of a mode of transport being utilized by the user provided with the user terminal 200 on a travel route of the user terminal 200 moving from one position to another position. The fourth additional information may include information on an estimated arrival time at which the user provided with the user terminal 200 is to arrive at an indoor space provided with the massage chair 100. The fifth additional information may include body condition prediction information which predicts a body condition of the user.

Hereinbelow, the embodiments of the present disclosure will be described in greater detail with reference to the accompanying drawings, and on all these accompanying drawings, the identical or analogous elements are designated by the same reference numeral, and repetitive description of the common elements will be omitted.

Figure 1:
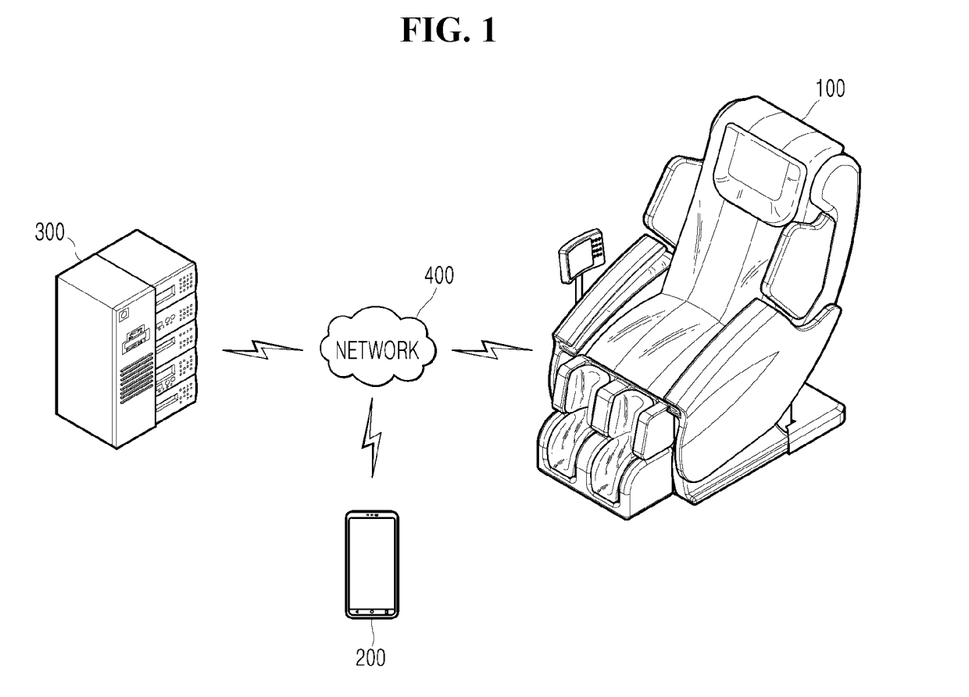
FIG. 1 is a diagram illustrating an example of a massage chair control environment according to an embodiment of the present disclosure, the massage chair control environment including a massage chair, a user terminal, a server, and a network connecting the massage chair, the user terminal, and the network to one another.

FIG. 1 is a diagram illustrating an example of a massage chair control environment according to an embodiment of the present disclosure, the massage chair control environment including a massage chair, a user terminal, a server, and a network connecting the massage chair, the user terminal, and the network to one another. Referring to FIG. 1, the massage chair control environment may include a massage chair 100, a user terminal 200, a server 300, and a network 400. The massage chair 100, the user terminal 200, and the server 300 may be connected to one another in a 5G communication environment. In addition, other than the devices illustrated in FIG. 1, various other electronic devices for use at a home or an office may be connected to each other and operate in an Internet-of-Things environment.

The massage chair 100 may apply dynamic stimuli directly to the body of the seated user through, for example, tapping, pressing, kneading, pulling, and moving the body of the user, in accordance with an operation mode. The massage chair 100 may massage one or more among the head, back, arms, buttocks, and legs of the seated user. The massage chair 100 described above may be provided in an indoor space, for example, a home.

In the present embodiment, the massage chair 100 may obtain one or more among the first information, the second information, and the third information from the user terminal 200 located in an indoor and/or an outdoor space. Here, the obtaining of one or more among the first information, the second information, and the third information from the user terminal 200 may be equivalent to obtaining one or more among the first information, the second information, and the third information with regard to the user provided with the user terminal 200. This may be based on the fact that the user carries the user terminal 200 on themselves at all times while moving.

The massage chair 100 may generate the fourth information by using one or more among the first information, the second information, and the third information obtained from the user terminal 200. The fourth information may be directly generated by the massage chair 100 or obtained from an external device through the network 400.

The massage chair 100 may automatically determine an optimal driving mode with respect to the massage chair 100 by using the first information to the fourth information. Here, an operation mode determined by the massage chair 100 is an automatic massage course, and may include, for example, one or more among a rest course, an energy course, a nighttime course, a stretching course, a relaxation course, a neck and shoulder course, a back and waist course, and a leg and foot course. The massage chair 100 may determine an optimal operation mode with respect to the massage chair 100 from the first information, the second information, and the third information by using a deep neural network that has been previously trained to determine an operation mode of the massage chair 100 from the geographic information, the motion information, and the usage amount information obtained from the user terminal 200. In some embodiments, the massage chair 100 may determine an optimal operation mode with respect to the massage chair 100 from the first information to the fourth information by using a deep neural network that has been previously trained to determine an operation mode of the massage chair 100 from the geographic information, the motion information, the usage amount information obtained from the user terminal 200, and additional information combining the same.

The user terminal 200, through an authentication process after connecting to a massage chair-driving application or a massage chair-driving site, may transmit one or more among the first information, the second information, and the third information to the massage chair 100, may monitor the state information of the massage chair 100, or may be provided with a service for driving or controlling the massage chair 100. In the present embodiment, after completing the authentication process, the user terminal 200, when user's voice command is received, may determine an operation mode of the massage chair 100 and operate the massage chair 100, or determine a massage point and/or a massage intensity and/or a massage duration, to control the operation of the massage chair 100.

In the present embodiment, the user terminal 200 may include a communication terminal capable of performing functions of a computing device (not illustrated), and may include, but is not limited to, a user-operable desktop computer, a smartphone, a notebook computer, a tablet PC, a smart TV, a mobile phone, a personal digital assistant (PDA), a laptop computer, a media player, a micro server, a global positioning system (GPS) device, an E-book reader, a digital broadcasting terminal, a navigation system, a kiosk information system, an MP3 player, a digital camera, a home appliance, and any other mobile or immobile computing devices. Also, the user terminal 200 may be a wearable terminal implemented with a communication function and a data processing function, in the form of, for example, a watch, glasses or goggles, a hairband, and a ring. The user terminal 200 is not limited to the aforementioned items, and may be any terminal capable of web-browsing.

The server 300 may be a database server which provides big data required for applying various artificial intelligence algorithms, data on speech recognition, and the like. Furthermore, the server 300 may include a web server or application server which enables remote control of the massage chair 100 by using a massage chair-driving application or a massage chair-driving web browser installed on the user terminal 200.

Artificial intelligence (AI) is an area of computer engineering science and information technology that studies methods to make computers mimic intelligent human behaviors such as reasoning, learning, self-improving, and the like.

Also, AI does not exist on its own, but is rather directly or indirectly related to a number of other fields in computer science. Particularly in recent years, there have been numerous attempts to introduce an element of AI into various fields of information technology to solve problems of the respective fields.

Machine learning is an area of artificial intelligence that includes the field of study that gives computers the capability to learn without being explicitly programmed. More specifically, machine learning is a technology that investigates and builds systems, and algorithms for such systems, that are capable of learning, making predictions, and enhancing its own performance on the basis of experiential data. Machine learning algorithms, rather than executing rigidly set static program commands, may take an approach that builds a specific model based on input data for deriving a prediction or decision.

The server 300 may receive and transmit signals from and to the massage chair 100 and/or the user terminal 200, and in particular, the server 300 may receive one or more among the first information, the second information, and the third information from the user terminal 200 and transmit the fourth information generated using one or more among the first information, the second information, and the third information to the massage chair 100. The server 300 may determine an optimal operation mode with respect to the massage chair 100 using one or more among the first information to the fourth information, and transmit the optimal operation mode thus determined to the massage chair 100.

The network 400 may serve to connect the massage chair 100, the user terminal 200, and the server 300 to each other. The network 400 may include a wired network such as a local area network (LAN), a wide area network (WAN), a metropolitan area network (MAN) or an integrated service digital network (ISDN), and a wireless network such as a wireless LAN, a CDMA, Bluetooth®, or satellite communication, but the present disclosure is not limited to these examples. The network 400 may also send and receive information using short distance communication and/or long distance communication. The short distance communication may include Bluetooth®, radio frequency identification (RFID), infrared data association (IrDA), ultra-wideband (UWB), ZigBee, and Wi-Fi (wireless fidelity) technologies, and the long distance communication may include code division multiple access (CDMA), frequency division multiple access (FDMA), time division multiple access (TDMA), orthogonal frequency division multiple access (OFDMA), and single carrier frequency division multiple access (SC-FDMA The network 400 may include connections of network elements, such as hubs, bridges, routers, switches, and gateways. The network 400 may include one or more connected networks, including a public network such as the Internet and a private network such as a secure corporate private network. For example, the network may include a multi-network environment. Access to the network 400 may be provided via one or more wired or wireless access networks. Further, the network 400 may support 5G communication and/or an Internet of Things (IoT) network for exchanging and processing information between distributed components such as objects.

Figure 2:
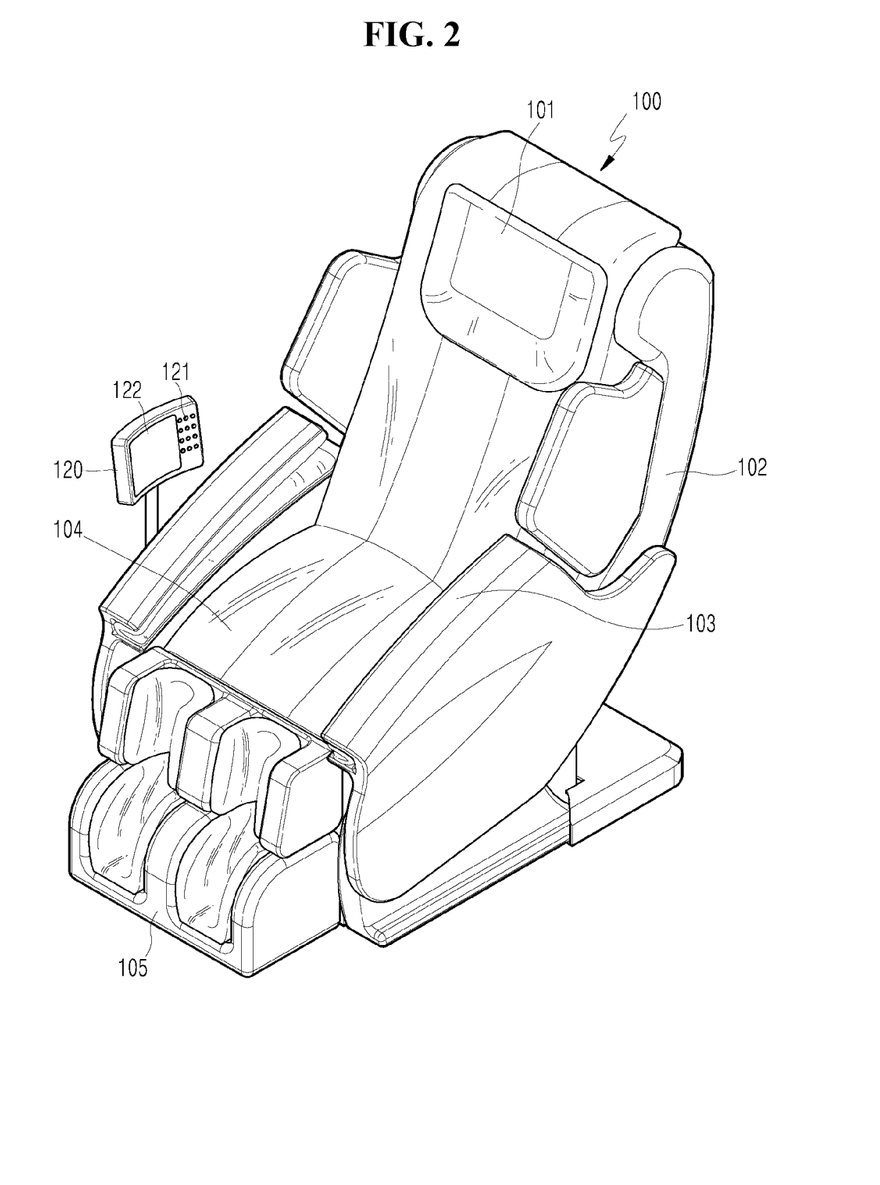
FIG. 2 is a front view of a massage chair according to an embodiment of the present disclosure.

FIG. 2 is a front view of a massage chair according to an embodiment of the present disclosure. Hereinbelow, the common parts previously described with reference to FIG. 1 will not be described, so as to avoid repetitive description.

Referring to FIG. 2, the massage chair 100 may include an upper end portion, a seat portion, and a lower end portion, depending on which part of a body is placed thereon. In particular, the upper end portion has a shape that embraces the user's head, the seat portion has a shape that allows the user's upper body to rest thereon, and the lower end portion has a shape that embraces the user's calves and feet, thereby providing comfort to the user. Here, the size and position of each portion of the massage chair 100 may be changed manually or automatically to accommodate characteristics of the body of the user.

The upper end portion may include a head massage unit 101 which supports the head of the user and massages the same. The seat portion may include a back massage unit 102 which supports user's back and massages the same, an arm massage unit 103 which supports user's arms and massages the same, and a buttock massage unit 104 which supports the user's buttocks and massages the same. The lower end portion may include a leg massage unit 105 which supports user's calves and feet and massages the same.

Further, the massage chair 100 may include a user interface unit 120. Here, the user interface unit 120 may include the display unit 121 which displays massage-related information under control of a controller (180 in FIG. 3) and the operation unit 122 which receives input from the user and transmits the same to the controller 180. In some embodiments, the user interface unit 120 may be implemented as a touch screen in which the display unit 121 and the operation unit 122 are combined into one.

Figure 3:
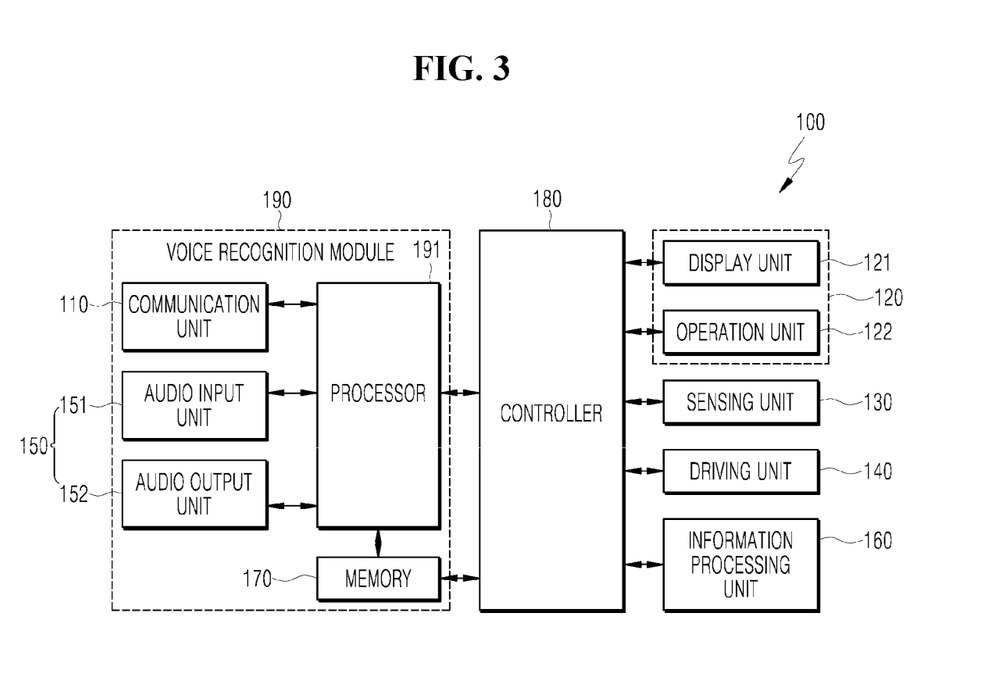
FIG. 3 is a schematic block diagram of a massage chair according to an embodiment of the present disclosure.

FIG. 3 is a schematic block diagram of a massage chair according to an embodiment of the present disclosure. Hereinbelow, the common parts previously described with reference to FIG. 1 and FIG. 2 will not be described, so as to avoid repetitive description. Referring to FIG. 3, the massage chair 100 may include a communication unit 110, a user interface unit 120, a sensing unit 130, a driving unit 140, an audio processing unit 150, an information processing unit 160, a memory 170, a controller 180, and a processor 191. The user interface unit 120 may include a display unit 121 and an operation unit 122. The audio processing unit 150 may include an audio input unit 151 and an audio output unit 152. In the present embodiment, the communication unit 110, the audio input unit 151, the audio output unit 152, the memory 170, and the processor 191 may be included in a speech recognition module 190.

The communication unit 110 may provide a communication interface required to provide signals transmitted/received between the massage chair 100, the user terminal 200, and/or the server 300 in the form of packet data in cooperation with the network 400. Further, the communication unit 110 may support various machine-to-machine communications (for example, Internet of Things (IoT), Internet of Everything (IoE), Internet of Small Things (IoST), etc.) and further support communications such as machine-to-machine (M2M) communication, vehicle-to-everything (V2X) communication, and device-to-device (D2D) communication.

The display unit 121 in the user interface unit 120 may display a driving state of the massage chair 100 under control of the controller 180. In the present embodiment, the display unit 121 may display a determination result of an operation mode in accordance with a determination result of the determining unit (165 in FIG. 4). FIG. 5 illustrates an example of an operation mode displayed on the display unit 121 and/or the user terminal 200, which will be described below. In some embodiments, the display unit 121 may include a touch screen forming an interlayer structure with a touchpad. In this case, the display unit 170 may be utilized not only as an output device, but also as an input device through which data can be inputted by a user's touch. To this end, the display unit 121 may include a touch-recognition display controller or other various input/output controllers. For example, the touch recognition display controller may provide an output interface and an input interface between a device and the user. The touch recognition display controller may transmit and receive electric signals to and from the controller 180. Also, the touch recognition display controller displays visual output to the user, and the visual output may include text, graphics, image, video, and a combination thereof. As described above, the display unit 121 may be a predetermined display member, for example, a touch-recognizable organic light emitting display (OLED) or a liquid crystal display (LCD) or a light emitting display.

The operation unit 122 in the user interface unit 120 may be provided with a plurality of operation buttons (not illustrated) and may transmit a signal corresponding to an inputted button to the controller 180. As described above, the operation unit 122 may be composed of a sensor capable of recognizing user's touch or pressing operation, a button, or a switch structure. In the present example, the operation unit 122 may transmit to the controller 180 an operation signal operated by the user in order to confirm or modify various information regarding the operation of the massage chair 100 displayed on the display unit 121.

The sensing unit 130 may obtain data for obtaining information on at least one of the body shape, posture, or location of the user seated in the massage chair 100. The sensing unit 130 may include at least one sensor disposed on a part that comes in contact with the user. Here, the at least one sensor may include at least one among a capacitance sensor, a pressure sensor, and a piezoelectric sensor, and when the user comes in contact with the massage chair 100, may obtain data on at least one of a contact surface and a contact intensity. In this case, the controller 180 may obtain information on at least one among the body shape, the posture, or the location of the user, on the basis of the data obtained by the sensing unit 130.

Meanwhile, the sensor included in the sensing unit 130 is not limited to the capacitance sensor, the pressure sensor, and the piezoelectric sensor previously mentioned, but may include any sensor capable of collecting data for obtaining information on at least one of the body shape, the posture, or the location of the user. In addition, the sensing unit 130 may obtain data for obtaining information on an inclination of the massage chair 100. Here, the information on the inclination of the massage chair 100 may include at least one among inclination information on the head massage unit 101, inclination information on the back massage unit 102, inclination information on the arm massage unit 103, inclination information on the buttock massage unit 104, inclination information on the leg massage unit 105, and inclination information on the overall massage chair 100.

Further, the sensing unit 130 may include one or more sensors capable of measuring the rotation of at least one among the head massage unit 101, the back massage unit 102, the arm massage unit 103, the buttock massage unit 104, and the leg massage unit 105. Also, the entire massage chair 100 may rotate, and the sensing unit 130 may measure the rotation or inclination of the massage chair 100. To this end, the one or more sensors included in the sensing unit 130 may be at least one among an inertial sensor, a magnetic sensor, a gravity sensor, a gyroscope sensor, or an acceleration sensor.

The driving unit 140 may generate power for performing massage under control of the controller 180. The driving unit 140 may transmit the generated power to one or more among the massage unit 101 supporting the user's head and massaging the head, the back massage unit 102 supporting the user's back and massaging the back, the arm massage unit 103 supporting the user's arms and massaging the arms, the buttock massage unit 104 supporting the user's buttocks and massaging the buttocks, and the leg massage unit 105 supporting the user's calves and feet and massaging the calves and the feet.

Further, the driving unit 140 may generate and transmit power for rotating one or more among the head massage unit 101, the back massage unit 102, the arm massage unit 103, the buttock massage unit 104, and the leg massage unit 105. To this end, the driving unit 140 may include at least one motor generating a rotational force and a power transmission unit transmitting the generated rotational force.

Also, each of the head massage unit 101, the back massage unit 102, the arm massage unit 103, the buttock massage unit 104, and the leg massage unit 105 may include an air bag (not illustrated), and the driving unit 140 may regulate the pneumatic pressure of the air bag of each of the head massage unit 101, the back massage unit 102, the arm massage unit 103, the buttock massage unit 104, and the leg massage unit 105, thereby performing massages at various intensities.

The audio input unit 151 in the audio processing unit 150 may receive a spoken utterance uttered by the user (for example, a voice command) inputted thereto and transmit the same to the controller 180, and the controller 180 may transmit the spoken utterance uttered by the user to the voice recognition module 190. To this end, the audio input unit 151 may be provided with at least one microphone (not illustrated). Further, there may be a plurality of microphones (not illustrated) provided in order to more accurately receive the spoken utterance of the user. Here, the plurality of microphones may be disposed separately in different places from each other, and may process the spoken utterance of the user as electric signals.

The audio output unit 152 in the audio processing unit 150 may output, as audio, an alarm sound, notification messages regarding an operation mode, an operation state, and an error state, information corresponding to a command input of the user, processing results corresponding to a command input of the user, and the like. The audio output unit 152 may convert electric signals from the controller 180 into audio signals, and output the same. To this end, the audio output unit 152 may be provided with a speaker or the like.

The information processing unit 160 may perform the following series of processes: obtaining one or more among the first information, the second information, and the third information from the user terminal 200 located in an indoor and/or outdoor space; generating the fourth information by using one or more among the first information, the second information, and the third information; and automatically determining an optimal driving mode with respect to the massage chair 100 by using the first information to the fourth information.

In the present embodiment, the information processing unit 160 may perform training in connection with the controller 180, or may receive training results from the controller 180. In the present embodiment, the information processing unit 160 may be provided outside the controller 180 as illustrated in FIG. 3, or may be provided inside the controller 180 and operate like the controller 180, or may be provided within the server 300 of FIG. 1. Next, the information processing unit 160 will be described in greater detail with reference to FIG. 4.

The memory 170 may store various information required for operations of the massage chair 100, and may include a volatile or non-volatile recording medium. For example, the memory 170 may store a preset wake-up word for determining the presence of a wake-up word from the user's spoken utterance. Meanwhile, the wake-up word may be set by the manufacturer. For example, "Hi, LG" may be set as the wake-up word and may be modified and set by the user. Such wake-up words are inputted in order to activate the massage chair 100, and the massage chair 100, upon recognition of the wake-up word uttered by the user, may switch to an operation standby mode. Further, the memory 170 may store the location information of the place provided with the massage chair 100, and information of a place frequently used by the user, for example, a workplace.

Here, the memory 170 may include magnetic storage media or flash storage media, but the scope of the present disclosure is not limited thereto. The memory 170 as described above may include magnetic storage media or flash storage media, but the scope of the present disclosure is not limited thereto. The memory 170 may include an internal memory and/or an external memory and may include a volatile memory such as a DRAM, a SRAM or a SDRAM, and a non-volatile memory such as one time programmable ROM (OTPROM), a PROM, an EPROM, an EEPROM, a mask ROM, a flash ROM, a NAND flash memory or a NOR flash memory, a flash drive such as an SSD, a compact flash (CF) card, an SD card, a Micro-SD card, a Mini-SD card, an XD card or memory stick, or a storage device such as a HDD.

The controller 180 is a type of a central processing unit which may drive control software provided in the memory 170 to control an overall operation of the massage chair 100. The controller 180 may control the massage point, the massage intensity, and the massage performance duration according to a driving mode (massage mode), and by using the driving unit 140, may control performance of a massage to at least one among the user's head, neck, left shoulder, right shoulder, back, waist, buttocks, left arm, right arm, left thigh, right thigh, left calf, and right calf. Furthermore, there may be a massage region that combines a plurality of the aforementioned massage regions. For example, the plurality of the massage regions may include at least one among the user's head, neck, shoulders, waist, buttocks, arms, and legs.

Here, the controller 180 may include devices of all kinds capable of processing data, such as a processor. Here, the 'processor' may refer to a data processing device embedded in hardware, which has a physically structured circuit for performing functions represented as a code or command included in programs. Examples of the data processing device embedded in hardware include processing devices such as a microprocessor, a central processing unit (CPU), a processor core, a multiprocessor, an application-specific integrated circuit (ASIC), a field programmable gate array (FPGA), and the like, but the scope of the present disclosure is not limited thereto.

In the present embodiment, the controller 180, in order to determine an optimal driving mode with respect to the massage chair 100, may perform machine learning, for example, deep learning, and the memory 170 may store data for use in machine learning, result data, and the like.

Deep learning, which is a subfield of machine learning, may allow a device or apparatus to perform learning in multiple, progressively deeper stages based on data. Deep learning may represent a set of machine learning algorithms that extract core data from a plurality of data sets as the number of layers in increases.

Deep learning structures may include an artificial neural network (ANN). For example, the deep learning structure may include a deep neural network (DNN), such as a convolutional neural network (CNN), a recurrent neural network (RNN), and a deep belief network (DBN). In the present embodiment, the deep learning structure may use a variety of structures well known to those skilled in the art. For example, the deep learning structure according to the present disclosure may include a CNN, a RNN, and a DBN. The RNN is widely used in natural language processing, and can be effectively used to process time-series data that changes over time, and may construct an ANN structure by progressively extracting higher level features through multiple layers. The DBN may include a deep learning structure that is constructed by stacking the result of restricted Boltzman machine (RBM) learning in multiple layers. When a predetermined number of layers are constructed by repetition of such RBM learning, the DBN provided with the predetermined number of layers can be constructed. The CNN includes a model mimicking a human brain function, built on the basis of the assumption that, when a person recognizes an object, the object is recognized on the basis of the results of complex processing in the brain after basic features of the object are extracted.

Further, the artificial neural network may be trained by adjusting connection weights between nodes (and a bias value if necessary) so as to produce a desired output from a given input. Furthermore, the artificial neural network may continuously update the weight values through training. Furthermore, methods such as back propagation may be used in training the artificial neural network.

Meanwhile, the controller 180 may have an artificial neural network installed therein, and may perform machine learning-based user recognition and user's voice color recognition using audio input signals being received as input data.

The controller 180 may include an artificial neural network, for example, a deep neural network (DNN) such as a CNN, an RNN, or a DBN, and may train the DNN. As a machine learning method for such an artificial neural network, both unsupervised learning and supervised learning may be used. The controller 180 may perform control such that a voice color recognition artificial neural network structure is updated after training according to settings.

In the present embodiment, the communication unit 110, the audio input unit 151, the audio output unit 152, the memory 170, and the processor 191 may be included in a speech recognition module 190.

In the present embodiment, the speech recognition module 190 may include the communication unit 110 which transmits, to the user terminal 200 and/or the server 300, a driving signal corresponding to a voice command and/or various information, the audio input unit 151 which receives a voice command, the audio output unit 152 which outputs a speech recognition result as audio, and the processor 191 which generates a driving signal of the massage chair 100 by analyzing the voice command using speech recognition algorithms.

Figure 4:
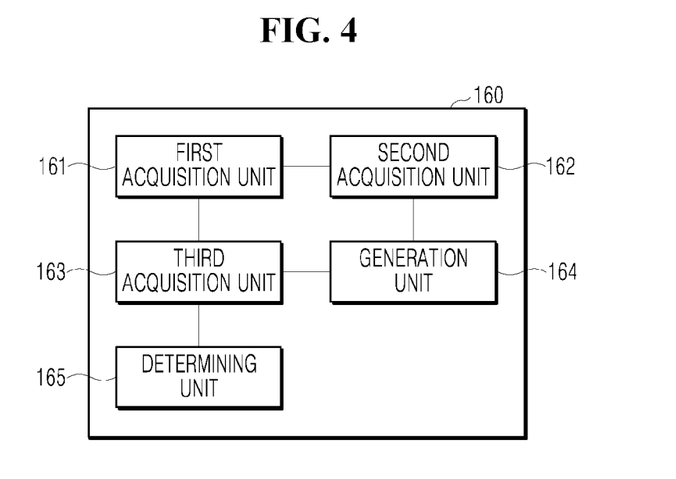
FIG. 4 is a schematic block diagram of a processing unit shown in FIG. 3.
Figure 5:
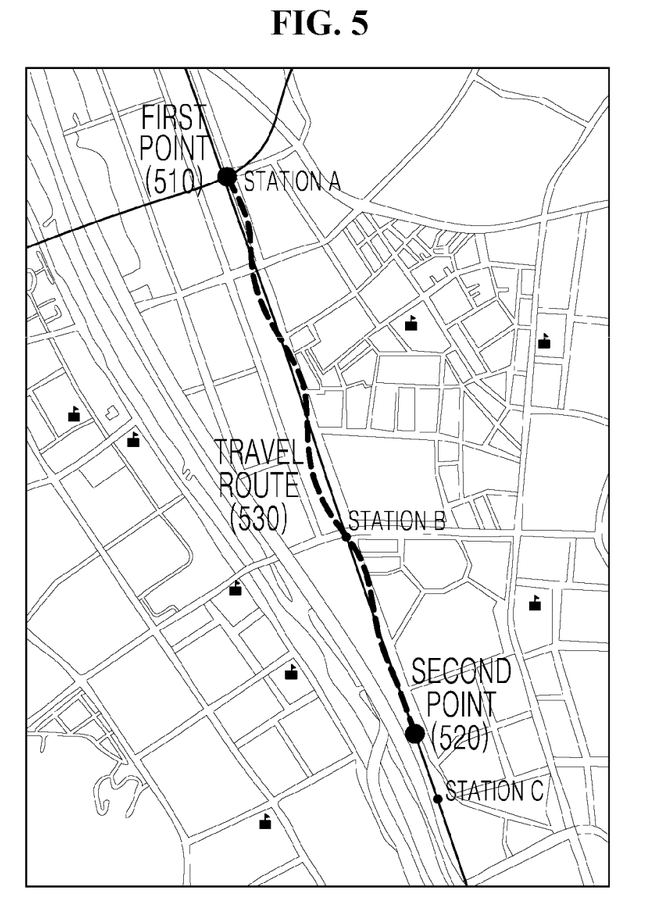
FIG. 5 is a diagram illustrating a travel route of a user displayed on a map using information obtained from a user terminal according to an embodiment of the present disclosure.

FIG. 4 is a schematic block diagram of a processing unit shown in FIG. 3. In the following description, the common parts previously described with reference to FIG. 1 and FIG. 3 will not be described, so as to avoid repetitive description. Referring to FIG. 4, the information processing unit 160 may include the first acquisition unit 161, the second acquisition unit 162, the third acquisition unit 163, the generation unit 164, and the determining unit 165.

The first acquisition unit 161 may obtain, from the user terminal 200 located in an indoor and/or outdoor space, the first information of the user terminal 200. Here, the first information may include location information including a longitude and latitude of the user terminal 200 and GPS information including time information corresponding to the location information.

The second acquisition unit 162 may obtain, from the user terminal 200 located in an indoor and/or outdoor space, the second information generated in the user terminal 200. Here, the second information is motion state information of the user terminal 200, and may include motionless state information on the user terminal 200 which is in any one state among sit, stand, absolute rest, and fiddle; and in-motion state information on the user terminal 200 which is in any one state among walk, run, and in-transit. In some embodiments, the generation unit 164, which will be described below, may generate the second information. To this end, the second acquisition unit 162 may obtain motion detection information sensed by a sensor of the user terminal 200 from the user terminal 200. The generation unit 164 may have the motion state change algorithm and the CMC provided therein. The generation unit 164 may generate motion state information of the user terminal 200 by applying the motion detection information obtained by the second acquisition unit 162 to the motion state change algorithm and the CMC.

The third acquisition unit 163 may obtain from the user terminal 200 located in an indoor and/or outdoor space, the third information of the user terminal 200. Here, the third information may be usage amount information of the user terminal 200, and may include information usage time information of the user terminal 200 and information quantifying usage time and usage frequency of an application provided in the user terminal 200.

The generation unit 164 may generate fourth information as additional information which can determine an operation mode of the massage chair 100, by using one or more among the first information, the second information, and the third information obtained from the first acquisition unit 161, the second acquisition unit 162, and the third acquisition unit 163. The fourth information generated by the generation unit 164 may be obtained from an external device (not illustrated) through the network 400, or may be directly generated. In the present embodiment, the additional information includes first additional information to fifth additional information, and when the second information is generated in the massage chair 100, the second information may be included in sixth additional information.

The generation unit 164 may generate the first additional information by using the first information, the first additional information including relevant area information and surrounding environment information with respect to a place where the user terminal 200 is located. The generation unit 164 may obtain, through the network 400, the relevant area information and surrounding environment information with respect to a place where the user terminal 200 is located, and by aligning and processing the same, may generate the first additional information for use in determining the operation mode of the massage chair 100. The generation unit 164 may use web crawling technology in order to generate the first additional information. Here, the web crawling may be a technology that collects web pages and the like, which contain the relevant area information and surrounding environment information and are stored and scattered in numerous external devices, and includes the web pages as indexes of a search target. The web crawling is repeated in a predetermined cycle, and information thus collected may be modified, preserved, or deleted according to a web crawling cycle. Here, the relevant area information may include information such as the region name of a place where the user terminal 200 is located (for example, country and address information) and the names of buildings (such as restaurants, shopping malls, offices, and stores). Further, the surrounding environment information may include information relating to the place traffic information, weather information, floating population information, news/event information, public office announcement information, map information, and information announced to residents by public offices in the region such as community centers, fire departments, and community health centers.

The generation unit 164 may generate second additional information including map information corresponding to a travel route of the user terminal 200 moving from one point to another point, by using the first information and the second information. Here, the one point may be an initial point of the user terminal 200, and the other point may be a current point. Depending on the embodiment, in a case when the user terminal is in a motionless state on the basis of the second information, the one point and the other point may be identical. The generation unit 164, by using the first information of the user terminal 200, may obtain map information from an external device (for example, a map information providing device), and may generate real-time map information in which a location of the user terminal 200 and a travel status of the user terminal 200 are displayed.

The generation unit 164 may generate third additional information by using one or more among the first information, the second information, the third information, and the second additional information, the third additional information including type information of a mode of transport being utilized by the user provided with the user terminal 200 on a travel route of the user terminal 200 moving from one point to another point. The generation unit 164 may generate the type information of the mode of transport by using speed information of the user terminal 200 in the map information included in the second additional information. The speed information of the user terminal 200 may be calculated (travel distance/travel time) using the first information. The generation unit 164 may learn whether the user terminal 200 is located on a highway, on a railway, on a regular road, or on a sidewalk; and in addition thereto, whether a user, to which the speed information of the user terminal 200 is applied, is utilizing a mode of transport or moving on foot, and furthermore, may generate the type information of the mode of transport utilized by the user. Here, the type of the mode of transport may include, for example, a car, a bus, a train, a subway, an airplane, a ship or boat, and a bicycle. Referring to FIG. 5, a travel route 530 of a user from a first point 510 to a second point 520 is illustrated in the map information. Since the first point 510 is at station A and the second point 520 is located between station B and station C, the travel route 530 displayed on the map information is extremely similar to a subway line. It can thus be learned that the user is riding on a subway. Also, in a case when the third information is more relevant when generating the type information of a mode of transport, it is possible to learn whether the user is personally driving, or what application the user terminal 200 is executing in the mode of transport being utilized by the user. Also, depending on the mode of transport utilized, the second information of the user terminal 200 and/or the third information of the user terminal 200 are obtained differently, and thus, the mode of transport being utilized by the user with the user terminal can be more accurately defined.

The generation unit 164 may generate the fourth additional information including an estimated arrival time at which the user provided with the user terminal 200 may arrive at an indoor space provided with the massage chair 100, by using one or more among the first information, the second information, the third information, and the second additional information. The generation unit 164 may generate estimated arrival time information including an estimated arrival time to arrive at the location of the place provided with the massage chair 100 from a current location, by using location information on the place provided with the massage chair 100 stored in the memory 170, user location information and speed information included in the first information, and type information on the mode of transport included in the third additional information. For example, if a distance to be traveled from a current location to the location of a place provided with the massage chair 100 is 60 km, and the user is riding a car and moving on a regular road at 60 km/h, the travel time is one hour, and if a current time is 6 pm, the estimated arrival time will be 7 pm. In addition, if the first additional information including traffic information, weather information, and the like, and/or the third information are applied, the estimated arrival time may change.

The generation unit 164 may generate the fifth additional information including physical condition prediction information capable of predicting a physical condition of the user provided with the user terminal 200, by using one or more among the first information, the second information, the third information, the first additional information, the second additional information, the third additional information, and the fourth additional information. The generation unit 164 may predict the physical condition of the user, for example, leg pain, neck pain, and the like, by using the travel speed and the mode of transport utilized on an arbitrary travel route of the user provided with the user terminal 200, an application executed on the user terminal 200, and a time. For example, a case may be considered in which, on an arbitrary travel route (for example, workplace-supermarket-home), the user plays a game while traveling 50 km by bus from a workplace to a supermarket, and having arrived at the supermarket, the user walks around for about one hour for grocery shopping, and while traveling 10 km by taxi from the supermarket to his or her home, the user watches a video. In this case, the generation unit 164 may combine and process information related to the user's actions described above, and may generate physical condition prediction information, such as the presence of leg swelling and pain in the waist and shoulders in the user's body.

The determining unit 165 may determine an optimal driving mode with respect to the massage chair 100 by using the first information to the fourth information. Also, the determining unit 165 may determine an optimal operation mode with respect to the massage chair 100 from the first information to the fourth information by using a deep neural network previously trained to determine an operation mode of the massage chair 100.

The determining unit 165 may activate the massage chair 100 in time for the estimated arrival time of the user, and may determine to cut off power to the massage chair 100 if the user is to remain outside for an extended time. For example, a case may be considered in which the user uses a subway for three hours to travel between his or her home and the workplace, and spends eight hours at work. In this case, the determining unit 165 may learn, from the first information to the fourth information, that the user was sitting for a long time and was standing while using public transportation, and the determining unit 165 may determine a driving mode (for example, a massage course) which enhances stretching of the waist, the arms, and the thighs, and a foot massage. As described above, until the user provided with the user terminal 200 comes back from a prolonged absence, the determining unit 165 may predict a physical condition of the user by using the first additional information to the fourth additional information generated using one or more among the first information, the second information, and the third information, and may determine and suggest a driving mode (for example, a massage course) optimized according to the physical condition of the user. The determining unit 165 may perform processing such that the determined driving mode is outputted through the display unit 121 and/or the audio output unit 152 upon arrival of the user, thereby inducing the user to use the massage chair 100.

In some embodiments, when the user remains present in an indoor space without going outside, the determining unit 165 may predict the physical condition of the user by using the second information and the third information. For example, if the determining unit 165 learns from the first information to the fourth information that the user has done household chores at home or played games for a long time, the determining unit 165 may determine a driving mode (for example, a massage course) of the massage chair 100 in accordance with such activities of the user.

Figure 6:
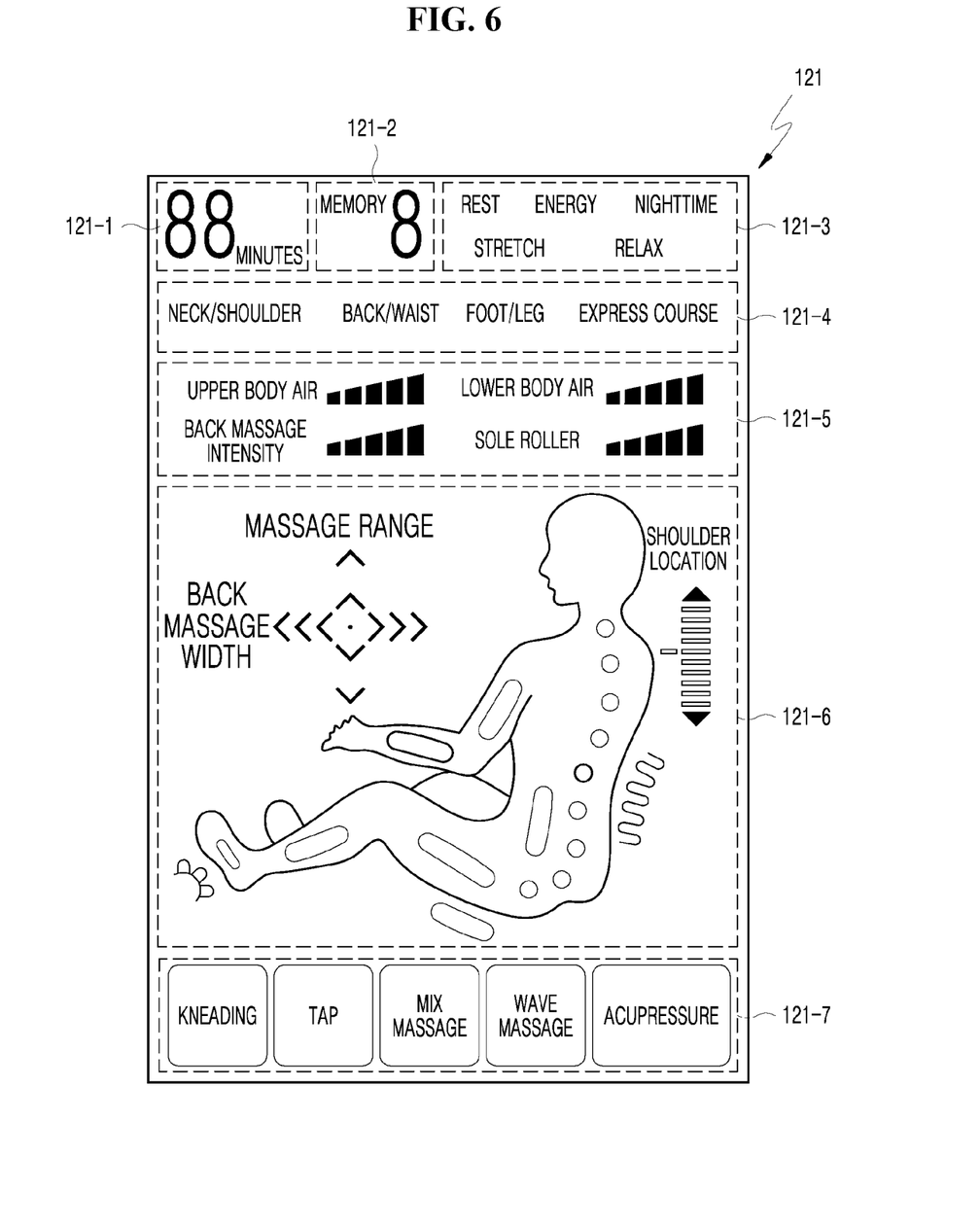
FIG. 6 is a diagram illustrating an operation mode displayed on the display unit of FIG. 3.

FIG. 6 is a diagram illustrating an operation mode displayed on the display unit of FIG. 3. In the following description, the common parts previously described with reference to FIG. 1 and FIG. 5 will not be described, so as to avoid repetitive description.

Referring to FIG. 6, the display unit 121 is divided into a first region 121-1 to a seventh region 121-7 and may display different information on the respective regions. The first region 121-1 may display a massage duration of the massage chair 100.

The second region 121-2 may display a user mode selection environment in which a driving mode (a massage mode) stored in the memory 170 can be selected. In the present embodiment, an optimal massage mode desired by the user may be stored in the memory 170, and when the massage mode stored in the memory 170 is selected, the selected user mode may be displayed on the second region 121-2.

The third region 121-3 and the fourth region 121-4 may display information corresponding to an automatic massage course in which a massage point, a massage intensity, and the like, are automatically set, and the user may select one or more massage courses. Here, the automatic massage courses may include, for example, a rest course, an energy course, a nighttime course, a stretching course, a relaxation course, a neck and shoulder course, a back and waist course, and a leg and foot course. When the user selects a course of his or her preference among the automatic massage courses, the selected massage course may be displayed on the third region 121-3 and the fourth region 121-4.

The fifth region 121-5 may display massage option adjustment information capable of adjusting massage options such as massage intensities. For example, on the fifth region 121-5, the user may adjust the massage options in terms of intensity, such as upper body air intensity, lower body air intensity, back massage intensity, and sole roller massage intensity.

On a sixth region 121-6, massage point information of a massage point being currently massaged may be displayed, and the user may more precisely modify the massage point to a point preferred by the user.

On a seventh region 121-7, manual selection information which allows massage actions to be manually selected may be displayed. For example, on the seventh region 121-7, the user may manually select massage courses such as kneading, hitting, mixed massage, wave massage, and acupressure.

Figure 7:
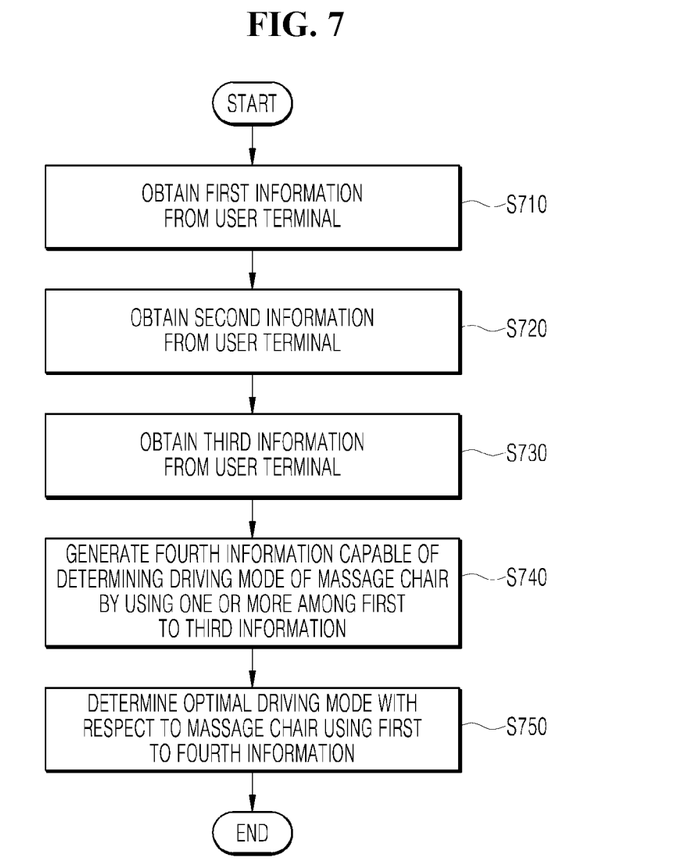
FIG. 7 is a flowchart illustrating a method of operating a massage chair according to an embodiment of the present disclosure.

FIG. 7 is a flowchart illustrating a method of operating a massage chair according to an embodiment of the present disclosure. In the following description, a description of the common parts previously described with reference to FIG. 1 and FIG. 6 will be omitted.

Referring to FIG. 7, in step S710, the massage chair 100 obtains the first information of the user terminal 200 from the user terminal 200 located in an indoor and/or outdoor space. Here, the first information may include GPS information including location information including a longitude and latitude of the user terminal 200, and time information corresponding to the location information.

In step S720, the massage chair 100 obtains the second information generated from the user terminal 200, from the user terminal 200 located in an indoor and/or outdoor space. Here, the second information may include motion state information which classifies the motion of the user terminal into a motionless state or an in-motion state by using information sensed by a sensor provided in the user terminal. The motionless state in the motion state information may include the user terminal 200 which is in any one state among sit, stand, absolute rest, and fiddle. The in-motion state in the motion state information may include the user terminal 200 being in any one state among walk, run, and in-transit. In some embodiments, the massage chair 100 may generate the second information. To this end, the massage chair 100 may obtain, from the user terminal 200, motion detection information sensed by a sensor of the user terminal 200, and generate the second information as motion state information of the user terminal 200 by using the motion detection information obtained from the user terminal 200, a motion state change algorithm, and a CMC provided in the massage chair 100.

In step S730, the massage chair 100 obtains the third information of the user terminal 200 from the user terminal 200 located in an indoor and/or outdoor space. Here, the third information may be usage time information of the user terminal 200 and usage amount information which quantifies usage time and usage frequency of an application provided on the user terminal 200.

In step S740, the massage chair 100 generates the fourth information by using one or more among the first information, the second information, and the third information obtained from the user terminal 200. Here, the fourth information may include additional information which may determine an operation mode of the massage chair. Such additional information may include the first additional information to the fifth additional information. The first additional information may include relevant area information and surrounding environment information with respect to a place where the user terminal 200 is located. The second additional information may include map information corresponding to a travel route of the user terminal 200 moving from one position to another position. The third additional information may include type information of a mode of transport being utilized by the user provided with the user terminal 200 on a travel route of the user terminal 200 moving from one position to another position. The fourth information may include information on an estimated arrival time at which the user provided with the user terminal 200 is to arrive at an indoor space provided with the massage chair 100. The fifth additional information may include body condition prediction information which predicts a body condition of the user.

In step S750, the massage chair 100 determines an optimal operation mode using the first information to the fourth information. The massage chair 100 may determine an optimal operation mode with respect to the massage chair 100 from the first information, the second information, and the third information by using a deep neural network that has been previously trained to determine an operation mode of the massage chair 100 from the geographic information, the motion information, and the usage amount information obtained from the user terminal 200. In some embodiments, the massage chair 100 may determine an optimal operation mode with respect to the massage chair 100 from the first information to the fourth information by using a deep neural network that has been previously trained to determine an operation mode of the massage chair 100 from the geographic information, the motion information, the usage amount information obtained from the user terminal 200, and additional information combining the aforementioned information.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of program code include both a machine code, such as produced by a compiler, and a higher-level code that may be executed by the computer using an interpreter.

As used in the present application (especially in the appended claims), the terms 'a/an' and 'the' include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example", etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various alterations, permutations, and modifications may be made within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A method of operating a massage chair, the method comprising:

obtaining, from a user terminal of a user in a location different from a location at which the massage chair is disposed, first information corresponding to geographic information generated by the user terminal;

obtaining, from the user terminal of the user in the location different from the location at which the massage chair is disposed, second information corresponding to motion information generated by the user terminal;

obtaining, from the user terminal of the user in the location different from the location at which the massage chair is disposed, third information corresponding to usage amount information of the user terminal;

generating fourth information as additional information by using at least one of the first information, the second information, or the third information, wherein the additional information includes estimated arrival time information on an estimated arrival time at which the user terminal is to arrive at the location where the massage chair is disposed; and determining an optimal driving mode of the massage chair with respect to the user of the user terminal by using the first information to the fourth information.

2. The method of claim 1, wherein the first information includes global positioning system (GPS) information including location information and time information corresponding to the location information, and wherein the location information includes a latitude and longitude of the user terminal.

3. The method of claim 1, wherein the second information includes motion state information, the motion state information classifying the user terminal as being in a motionless state or in an in-motion state by using information sensed by a sensor provided in the user terminal.

4. The method of claim 1, wherein the third information includes usage time information of the user terminal and information quantifying usage time and usage frequency of an application provided in the user terminal.

5. The method of claim 1, wherein the second information includes motion detection information of the user terminal, sensed by a sensor provided in the user terminal, and wherein generating the fourth information includes generating motion state information of the user terminal by applying the motion detection information to a motion state change algorithm and a coarse motion classifier (CMC) provided within the massage chair.

6. The method of claim 1, wherein the additional information further includes relevant area information and surrounding environment information with respect to a place in which the user terminal is located, which is generated by using the first information.

7. The method of claim 1, wherein the additional information further includes map information corresponding to a travel route of the user terminal moving from one location to another location, which is generated by using the first information and the second information.

8. The method of claim 1, wherein the additional information further includes type information of a mode of transport being utilized by the user of the user terminal on a travel route of the user terminal moving from one location to another location, which is generated by using the at least one of the first information, the second information, or the third information.

9. The method of claim 1, wherein the additional information further includes physical condition prediction information predicting a physical condition of the user, which is generated by using the at least one of the first information, the second information, or the third information.

10. The method of claim 1, wherein determining of the optimal operation mode of the massage chair includes determining the optimal operation mode with respect to the user of the user terminal from the first information to the fourth information by using a deep neural network previously trained to determine an operation mode of the massage chair.

11. A computer program stored in a recording medium readable by a computer for executing the method of claim 1 by using the computer.

12. A massage chair, comprising:
   at least one body part massager;
   a first acquirer configured to obtain, from a user terminal of a user in a location different from a location at which the massage chair is disposed, first information corresponding to geographic information generated by the user terminal;
   a second acquirer configured to obtain, from the user terminal of the user in the location different from the location at which the massage chair is disposed, second information corresponding to motion information generated by the user terminal;
   a third acquirer configured to obtain, from the user terminal of the user in the location different from the location at which the massage chair is disposed, third information corresponding to usage amount information of the user terminal;
   a generator configured to generate fourth information by using at least one of the first information, the second information, or the third information, wherein the fourth information includes estimated arrival time information on an estimated arrival time at which the user of the user terminal is to arrive at the location where the massage chair is disposed;
   a determiner configured to determine an optimal driving mode with respect to the user of the user terminal by using the first information to the fourth information; and
   a controller configured to operate the at least one body part massager based on the determined optimal driving mode.

13. The massage chair of claim 12, wherein the first information includes GPS information including location information and time information corresponding to the location information, and
   wherein the location information includes a longitude and latitude of the user terminal.

14. The massage chair of claim 12, wherein the second information includes motion state information classifying a state of the user terminal as a motionless state or an in-motion state by using information sensed by a sensor provided in the user terminal.

15. The massage chair of claim 12, wherein the third information includes usage time information of the user terminal and information quantifying usage time and usage frequency of an application provided on the user terminal.

16. The massage chair of claim 12, wherein the second information includes motion detection information of the user terminal, sensed by a sensor provided in the user terminal, and
   wherein the generator is configured to generate motion state information of the user
   terminal by applying the motion detection information to a motion state change algorithm and a coarse motion classifier (CMC) provided inside the massage chair.

17. The massage chair of claim 12, wherein the fourth information further includes type information of a mode of transport being used by the user of the user terminal on a travel route of the user terminal moving from one location to another location, which is generated by the generator using the at least one of the first information, the second information, or the third information.

18. The massage chair of claim 12, wherein the determiner is configured to determine the optimal operation mode with respect to the user of the user terminal from the first information to the fourth information by using a deep neural network previously trained to determine an operation mode of the massage chair.

* * * * *